United States Patent
Van Hillo et al.

(10) Patent No.: US 9,226,512 B2
(45) Date of Patent: Jan. 5, 2016

(54) POULTRY PROCESSING APPARATUS

(71) Applicant: Meyn Food Processing Technology B.V., Oostzaan (NL)

(72) Inventors: Eric Adriaan Van Hillo, Oostzaan (NL); Martinus Casper Melchior Balthasar Waasdijk, Oostzaan (NL)

(73) Assignee: MEYN FOOD PROCESSING TECHNOLOGY B.V., Oostzaan (NL)

( * ) Notice: Subject to any disclaimer, the term of this patent is extended or adjusted under 35 U.S.C. 154(b) by 0 days.

(21) Appl. No.: 14/690,900

(22) Filed: Apr. 20, 2015

(65) Prior Publication Data
US 2015/0305353 A1 Oct. 29, 2015

(30) Foreign Application Priority Data
Apr. 24, 2014 (NL) .................................. 2012678

(51) Int. Cl.
*A22B 7/00* (2006.01)
*A22C 21/00* (2006.01)

(52) U.S. Cl.
CPC ......... *A22C 21/0053* (2013.01); *A22C 21/0023* (2013.01); *A22C 21/0046* (2013.01)

(58) Field of Classification Search
USPC ......... 452/177–184, 163, 166, 167, 169, 170, 452/149, 150, 152, 160
See application file for complete search history.

(56) References Cited

U.S. PATENT DOCUMENTS

| | | | | |
|---|---|---|---|---|
| 5,015,213 A | * | 5/1991 | Hazenbroek .................. | 452/149 |
| 5,147,240 A | * | 9/1992 | Hazenbroek et al. ......... | 452/165 |
| 5,176,563 A | | 1/1993 | Van den Nieuwelaar | |
| 5,188,559 A | * | 2/1993 | Hazenbroek .................. | 452/167 |
| 5,336,127 A | * | 8/1994 | Hazenbroek .................. | 452/160 |
| 6,004,199 A | * | 12/1999 | Habenicht et al. ............ | 452/166 |
| 6,322,438 B1 | * | 11/2001 | Barendregt et al. ........... | 452/167 |
| 8,834,237 B2 | * | 9/2014 | Van Hillo et al. ............. | 452/167 |

FOREIGN PATENT DOCUMENTS

WO  WO 2014062054  4/2014

OTHER PUBLICATIONS

Search report for NL 2012678 dated Aug. 23, 2014.

* cited by examiner

*Primary Examiner* — Richard Price, Jr.
(74) *Attorney, Agent, or Firm* — Dority & Manning, P.A.

(57) ABSTRACT

A poultry processing apparatus for removing legs from a saddle obtained from a poultry carcass. A suspension conveyor moves the saddle suspended by the legs. A surface conveyor for engages with and conveys the back portion of the saddle. One or more upper guide rails substantially following at least a part of the surface conveyor's outer circumference away from the suspension conveyor, therewith defining a gap between the surface conveyor and the upper guide rail or rails equipped to receive the saddles back portion. Adjacent to the surface conveyor a support guide or guides provide support to the back portion of the saddle while it is being conveyed by the surface conveyor.

14 Claims, 3 Drawing Sheets

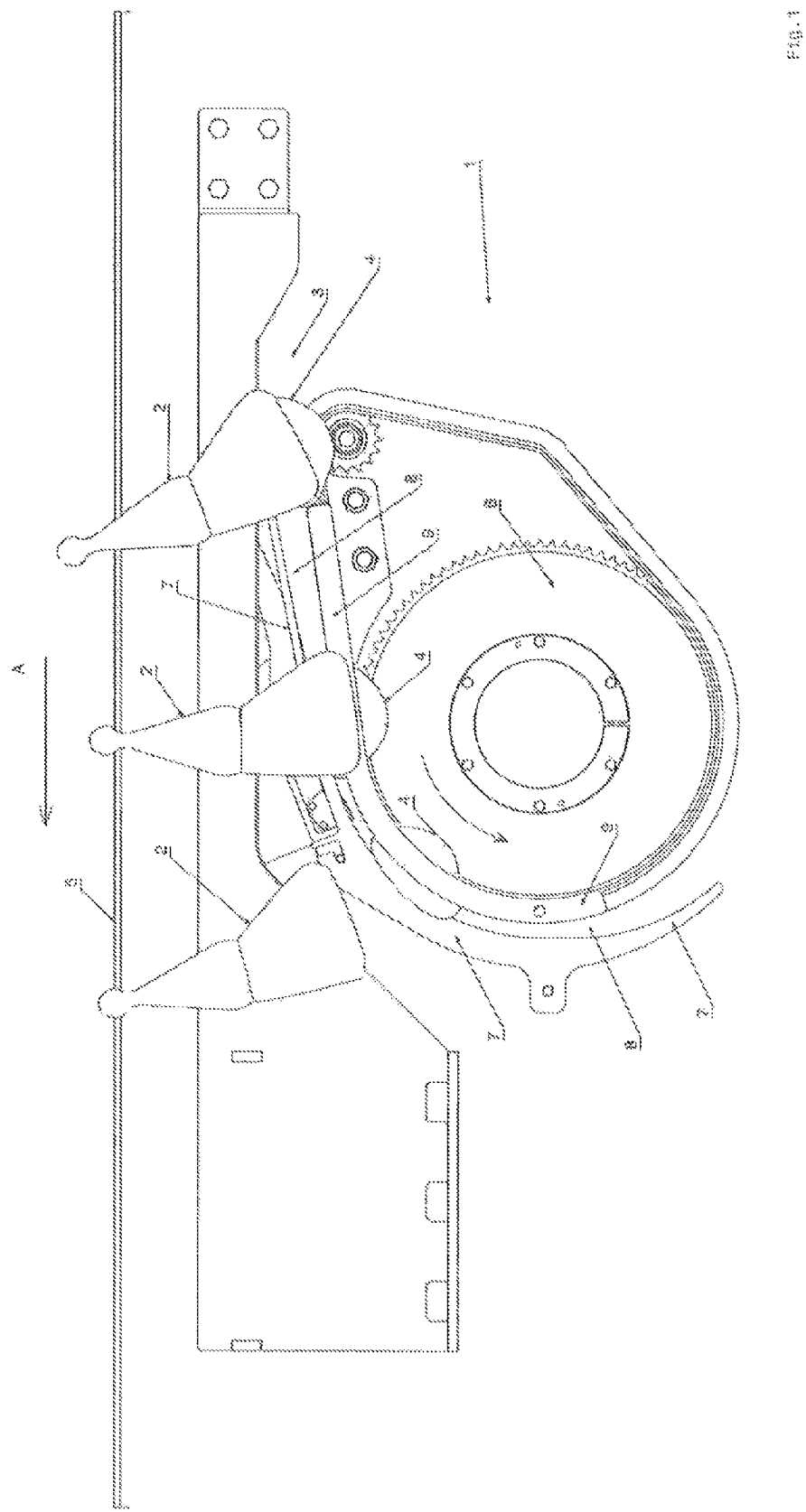

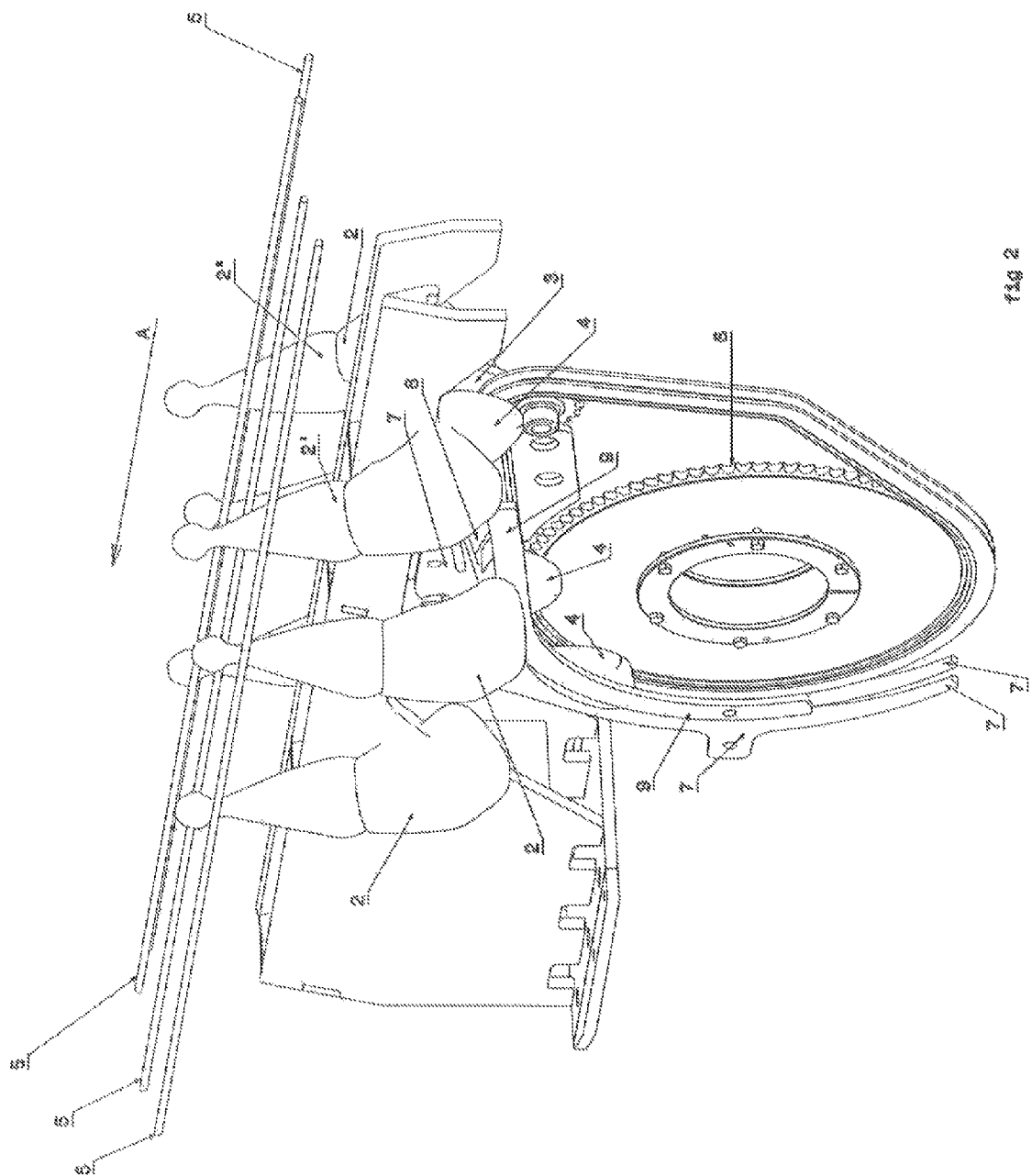

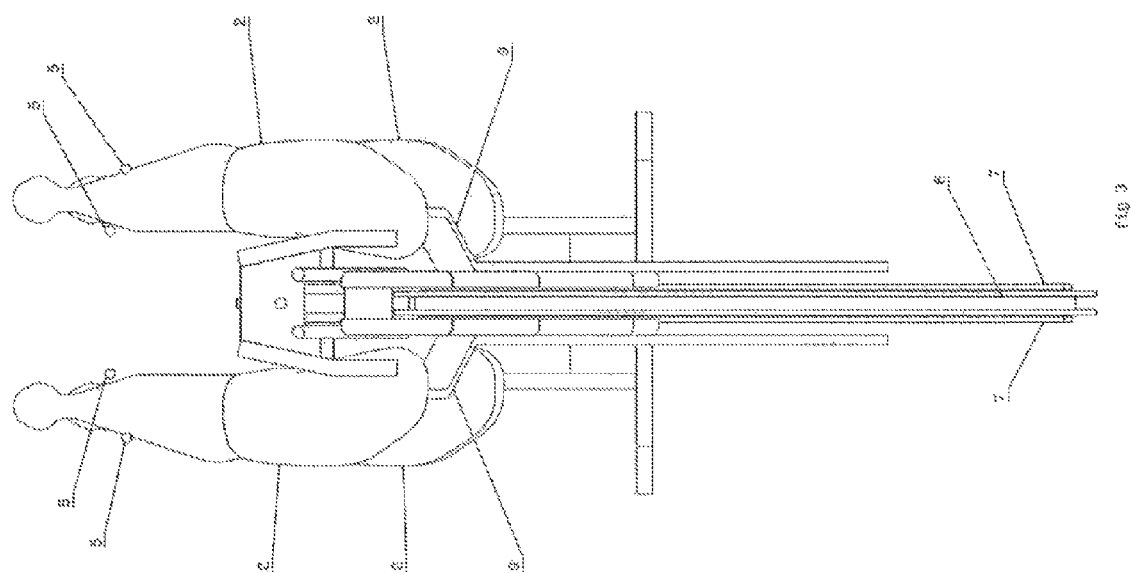

POULTRY PROCESSING APPARATUS

PRIORITY STATEMENT

The present application claims priority under 35 U.S.C. §119 to Dutch Application No. 2012678, filed Apr. 24, 2014.

FIELD OF THE INVENTION

The subject matter of the present disclosure relates generally to a poultry processing apparatus and method for removing legs from a saddle obtained from a poultry carcass.

BACKGROUND OF THE INVENTION

A poultry processing apparatus and method is known from U.S. Pat. No. 6,322,438 ('438 patent). The '438 patent mentions that a surface conveyor moves at a higher speed than a suspension conveyor in which the legs are received.

One of the problems of the known poultry processing apparatus and method is that the position maintenance of the back portion of the saddle in the gap between the surface conveyor and the upper guide rail or rails is not reliably secured. This may cause different results regarding the removal of the left and right legs from the back portion of the poultry. In particular, parts of the back portion of the poultry may remain attached with the legs, which are to be separated from the poultry back. When this happens, such may necessitate that the legs receive a manual follow-up treatment, which is costly. It is also detrimental to the visual appearance of the removed legs.

SUMMARY OF THE INVENTION

The subject matter of the present disclosure relates generally to a poultry processing apparatus and method for removing legs from a saddle obtained from a poultry carcass. The saddle includes a poultry back portion and two legs connected thereto. In an exemplary embodiment, an apparatus of the present invention includes a suspension conveyor for moving the saddle suspended by the legs in a conveying direction, a surface conveyor for engaging with and conveying the back portion of the saddle, and an upper guide rail or rails substantially following at least a part of the surface conveyor's outer circumference away from the suspension conveyor, therewith defining a gap between the surface conveyor and the upper guide rail or rails that is equipped to receive the back portion of the saddles.

Unlike the device of the '438 patent, with embodiments of the instant invention it is not essential that a surface conveyor moves at a higher speed than a suspension conveyor in which the legs are received. Instead, the surface conveyor that engages the back portion of the saddle may move at a speed that is comparable to the speed of the suspension conveyor.

Correspondingly it is an object of the invention to reliably and securely position the back portion of the saddle in the gap between the surface conveyor and the upper guide rail or rails whilst it is being conveyed in the saddles conveying direction.

It is a further object of the invention to process the saddle in such way that the resulting removal of the left and right legs exhibit comparable results.

It is still a further object of the invention to harvest the legs from the saddles without any remaining parts from the back portions of the saddles.

It is still a further object of the invention to avoid the necessity to apply a manual after treatment to the poultry legs removed from the saddles.

Further it is an object of the invention to provide legs removed from saddles that are visually attractive.

These and other objects of the invention are promoted with a method and a poultry processing apparatus as set forth in one or more of the appended claims. Additional aspects and advantages of the invention will be set forth in part in the following description, or may be obvious from the description, or may be learned through practice of the invention.

In a first exemplary aspect of the invention, a support guide or guides are provided adjacent to the surface conveyor to support the back portion of the saddle while it is being conveyed by the surface conveyor. It is with this surprisingly simple measure that the poultry back portion of the saddle can be reliably positioned—and remain reliably positioned—in the gap between the surface conveyor and the upper guide rail or rails at the entire track along which the surface conveyor moves the back portion of the saddle.

Preferably the support guides are provided at both sides of and adjacent to the surface conveyor. This provides best results for the positioning of the poultry back portion of the saddle.

Advantageously the support guide or support guides follow the curvature of the surface conveyor's outer circumference with a radius of curvature that is smaller than the radius of curvature of the surface conveyor. With a slightly less radius of curvature in comparison with the surface conveyor's outer circumference, the support guides provide optimal effect in maintaining the position of the poultry back portion.

There are multiple ways to embody the support guide or support guides. Highest cost efficiency is achieved when the support guide or support guides are stationary.

In one exemplary embodiment it is preferred that the support guide or support guides move concertedly with the surface conveyor. This restricts friction between the support guides and the poultry back portion, which avoids forces that may dislocate the poultry back portion from its optimal position. within the gap between the surface conveyor and the upper guide rails.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 illustrates a side view of an exemplary poultry processing apparatus of the invention; and FIG. 2 illustrates an isometric view of the poultry apparatus of the invention.

Whenever in the figures the same reference numerals are applied, these numerals refer to the same parts.

FIG. 3 is an end view of the exemplary apparatus of FIGS. 1 and 2.

DETAILED DESCRIPTION OF THE INVENTION

For purposes of describing the invention, reference now will, be made in detail to embodiments and/or methods of the invention, one or more examples of which are illustrated in or with the drawings. Each example is provided by way of explanation of the invention, not limitation of the invention. In fact, it will be apparent to those skilled in the art that various modifications and variations can be made in the present invention without departing from the scope or spirit of the invention. For instance, features or steps illustrated or described as part of one embodiment, can be used with another embodiment or steps to yield a still further embodiments or methods. Thus, it is intended that the present invention covers such modifications and variations as come within the scope of the appended claims and their equivalents.

In both FIG. 1 and FIG. 2, an exemplary poultry processing apparatus of the invention is generally referred to with reference 1. This exemplary poultry processing apparatus 1 serves to remove legs 2 from a saddle 3 obtained from a poultry carcass. A saddle 3 includes a poultry back portion 4 and two legs 2 (separately designated in FIG. 2 as leg 2' and leg 2") connected thereto.

The exemplary poultry processing apparatus I includes a suspension conveyor 5 for moving the saddle 3 suspended by the legs 2, 2', 2" in a conveying direction indicated with arrow A. Further, apparatus 1 includes a surface conveyor 6 for engaging with and conveying the back portion 4 of the saddle 3. Apparatus 1 includes an upper guide rail 7 (actually most of the time there are two rails 7, one on each side of the surface conveyor 6 as is clear from FIG. 2) substantially following at least a part of the surface conveyor's 6 outer circumference away from the suspension conveyor 5, therewith defining a gap 8 between the surface conveyor 6 and the upper guide rail 7 or rails, which is equipped to receive the saddles back portion 4.

In accordance with an exemplary aspect of the invention, adjacent to the surface conveyor 6 a support guide 9 or guides are provided to support the back portion 4 of the saddle 3 while it is being conveyed by the surface conveyor 6. Also, the support guides 9 are provided at both sides of the surface conveyor 6.

FIGS. 1 and 2 clearly show that the support guide 9 or support guides follow the curvature of the surface conveyor's 6 outer circumference with a radius of curvature that is smaller than the radius of curvature of the surface conveyor 6.

In the embodiment shown in. FIGS. 1 and 2, the support guide 9 or support guides are stationary. It is however also feasible that the support guide 9 or support guides move concertedly (or in synchronization) with the surface conveyor 6.

In operation, complete saddles 3 including a saddle back portion 4 with connected legs 2, 2', 2" enter the poultry processing apparatus I coming from the right in FIG. 1 and FIG. 2 and moving to the left in accordance with arrow A. Upon entering the processing apparatus 1, the back portion 4 of the saddle 3 is engaged by the surface conveyor 6 and is caught in the gap 8 between the surface conveyor 6 and the upper guide rails 7. Because the poultry legs 2, 2', 2" are suspended in the conveyor 5 and the distance between the conveyor 5 and the upper guide rails 7 increases whilst the saddles 4 are moved from right to left in the direction of the arrow A, the legs 2, 2', 2" are torn loose from the back portions 4 that are caught in the gap 8 between the surface conveyor 6 and the upper guide rails 7. In this process of separation of the legs 2, 2', 2" from the back portions 4, the accurate positioning of the back portions 4 is maintained due to the application of support guides 9 engaging with the back portions 4—thus providing support to the back portion 4 of the saddles 3 while their being conveyed by the surface conveyor 6. In this connection, it is preferable that the support guides 9 follow the curvature of the surface conveyor's 6 outer circumference with a radius of curvature that is smaller than the radius of curvature of the surface conveyor 6.

Although the invention has been discussed in the foregoing with reference to an exemplary embodiment of the apparatus of the invention, the invention is not restricted to this particular embodiment which can be varied in many ways without departing from the gist of the invention. The discussed exemplary embodiment shall therefore not be used to construe the appended claims strictly in accordance there-with. On the contrary the embodiment is merely intended to explain the wording of the appended claims without intent to limit the claims to this exemplary embodiment. The scope of protection of the invention shall therefore be construed in accordance with the appended claims only, wherein a possible ambiguity in the wording of the claims shall be resolved using this exemplary embodiment.

What is claimed is:

1. A poultry processing apparatus for removing legs from a saddle of a poultry carcass, the saddle including a poultry back portion connected with two legs, the apparatus comprising:
    a suspension conveyor configured for moving the saddle suspended by the legs in a conveying direction;
    a surface conveyor for engaging with and conveying the back portion of the saddle;
    an upper guide rail or rails having a radius of curvature substantially following at least a part of an outer circumference of the surface conveyor away from the suspension conveyor;
    a gap defined between the surface conveyor and the upper guide rail or rails, the gap configured to receive the back portion; and
    a support guide or guides adjacent to the surface conveyor and configured to support the back portion of the saddle while the saddle is being conveyed by the surface conveyor, wherein support guide or guides are spaced apart from the surface conveyor while following the outer circumference of the surface conveyor.

2. The poultry processing apparatus of claim 1, wherein the support guide or guides comprises guides that are provided at both sides of, and adjacent to, the surface conveyor.

3. The poultry processing apparatus of claim 1, wherein the support guide or support guides have a radius of curvature that is smaller than the radius of curvature of the surface conveyor.

4. The poultry processing apparatus of claim 1, wherein the support guide or support guides are stationary.

5. The poultry processing apparatus of claim 1, wherein the support guide or support guides move concertedly with the surface conveyor.

6. The poultry processing apparatus of claim 1, wherein the support guide or support guides are positioned closer to the surface conveyor than the upper guide rail or rails.

7. The poultry processing apparatus of claim 1, wherein the support guide or support guides contact the back portion of the saddle while the saddle is being conveyed by the surface conveyor.

8. The poultry processing apparatus of claim 1, wherein the back portion of the saddle is positioned between the support guide or support guides while the saddle is being conveyed by the surface conveyor.

9. The poultry processing apparatus of claim 1, wherein the support guide or guides comprises guides that are provided at both sides of, and adjacent to, the surface conveyor and are spaced apart from the surface conveyor.

10. A method for removing legs from a saddle of a poultry carcass, the saddle including a poultry back portion connected with two legs, comprising the steps of:

moving the saddle suspended by the legs in a conveying direction;

engaging with and conveying a back portion of the saddle with a surface conveyor, wherein an upper guide rail or rails have a radius of curvature that substantially follows at least a part of an outer circumference of the surface conveyor and define a gap between the surface conveyor and the upper guide rail or rails;

receiving the saddle's back portion within the gap; and supporting the back portion of the saddle with support means adjacent to the surface conveyor while the back portion is being conveyed by the surface conveyor.

11. A method for removing legs from a saddle of a poultry carcass as in claim 10, wherein support guides are positioned at both sides of and adjacent to the surface conveyor.

12. A method for removing legs from a saddle of a poultry carcass as in claim 11, wherein the support guide or support guides follow the curvature of the outer circumference of the surface conveyor with a radius of curvature that is smaller than the radius of curvature of the surface conveyor.

13. A method for removing legs from a saddle of a poultry carcass as in claim 11, wherein the support guide or support guides are stationary.

14. A method for removing legs from a saddle of a poultry carcass as in claim 11, wherein the support guide or support guides move concertedly with the surface conveyor.

\* \* \* \* \*